(12) United States Patent
Hattunen

(10) Patent No.: US 6,220,285 B1
(45) Date of Patent: Apr. 24, 2001

(54) DEVICE FOR ADJUSTING/CLOSING THE VALVE OF A GAS BOTTLE

(76) Inventor: Mauri Hattunen, Lepsämäntie 196, FIN-01800 Klaukkala (FI)

(*) Notice: Subject to any disclaimer, the term of this patent is extended or adjusted under 35 U.S.C. 154(b) by 0 days.

(21) Appl. No.: 09/269,399

(22) PCT Filed: Sep. 23, 1997

(86) PCT No.: PCT/FI97/00568

§ 371 Date: Mar. 26, 1999

§ 102(e) Date: Mar. 26, 1999

(87) PCT Pub. No.: WO98/13631

PCT Pub. Date: Apr. 2, 1998

(30) Foreign Application Priority Data

Sep. 27, 1996 (FI) .......................................................... 963874

(51) Int. Cl.[7] .............................. F16K 1/30; F16K 31/60; F16K 37/00

(52) U.S. Cl. ......................... 137/556; 251/291; 251/144

(58) Field of Search .................................... 251/144, 248, 251/250.5, 291, 293; 74/424.8 VA; 137/553, 556

(56) References Cited

U.S. PATENT DOCUMENTS

| | | | |
|---|---|---|---|
| 437,489 | * 9/1890 | Giles ..................................... | 251/293 |
| 868,130 | * 10/1907 | Russell ................................. | 251/144 |
| 1,111,865 | * 9/1914 | Serrell ............................... | 251/293 X |
| 1,506,433 | * 8/1924 | Knauf ..................................... | 251/248 |
| 2,964,961 | * 12/1960 | Gulick ........................... | 74/424.8 VA |
| 3,034,371 | * 5/1962 | Cantalupo et al. ........... | 74/424.8 VA |
| 3,399,862 | * 9/1968 | Cerow ............................... | 251/293 X |
| 3,701,362 | 10/1972 | Reese . | |
| 3,994,255 | 11/1976 | Thompson . | |
| 4,082,247 | * 4/1978 | Dalton .............................. | 251/248 X |
| 4,258,748 | 3/1981 | Guman . | |
| 4,448,148 | 5/1984 | Gain, Jr. . | |
| 4,497,340 | 2/1985 | Gain, Jr. . | |
| 4,629,157 | * 12/1986 | Tsuchiya et al. ................ | 251/291 X |
| 4,776,363 | * 10/1988 | Avelli ............................... | 251/291 X |
| 4,834,137 | * 5/1989 | Kawaguchi et al. ............ | 251/291 X |
| 4,895,345 | * 1/1990 | Gladbach et al. .................. | 251/144 |
| 4,901,977 | * 2/1990 | Hendrick .......................... | 251/248 X |
| 5,572,905 | * 11/1996 | Cook, Jr. ............................... | 74/411 |

FOREIGN PATENT DOCUMENTS

| | | |
|---|---|---|
| 1093154 | 11/1960 | (DE) . |
| 1902948 | * 7/1970 | (DE) . |
| 2548754 | * 1/1985 | (FR) . |

* cited by examiner

*Primary Examiner*—Kevin Shaver
*Assistant Examiner*—Eric Keasel
(74) *Attorney, Agent, or Firm*—Birch, Stewart, Kolasch & Birch, LLP

(57) ABSTRACT

The invention relates to a device for adjusting/closing the shut-off valve (2) of a gas bottle or a similar container. The device comprises a frame (7), a turning means (5), a coupling element (6) fitted to the regulating element (3) of the shut-off valve (2) of the gas bottle, and power transmission elements (8, 9, 10, 11) for the transmission of the motion of the turning means (5) to the regulating element (3). The turning means makes it easier to open/close the gas bottle. The turning means can serve as a valve state indicator.

14 Claims, 2 Drawing Sheets

DEVICE FOR ADJUSTING/CLOSING THE VALVE OF A GAS BOTTLE

BACKGROUND OF THE INVENTION

1. Field of the Invention

The present invention relates to a device for adjusting/closing a gas bottle valve.

2. Description of the Relevant Art

Gas bottles or gas cylinders, used in industry in conjunction with welding as containers of combustible gas and/or shielding gas, are provided with a rotatable shut-off valve, placed in the top part of the gas bottle. The shut-off valve is provided with a regulating wheel. The valve is closed by turning the valve manually by the regulating wheel in the clockwise or anti-clockwise direction, depending on the valve type, and opened by turning in the opposite direction.

The state of the valve, i.e. whether the valve is open or closed, is difficult to determine by merely looking. Therefore, in practice, the state of the valve is checked manually by turning the regulating wheel. Sometimes it happens that a gas bottle valve is left open for a long time, e.g. over a weekend, which may lead to dangerous situations and also economic losses.

Gas bottle shut-off valves used at present are provided with a protective cap, which is open on two sides and has a handle-like neck at its top. This protective cap makes it still more difficult to open/close the valve. Further problems in the handling of the bottle result from the pressure reduction valve and associated indicators that the bottles are usually provided with.

SUMMARY OF THE INVENTION

The object of the present invention is to achieve a completely new type of valve solution that eliminates the drawbacks of prior art.

The invention is based on the idea that the gas bottle valve is provided with an accessory that allows the valve to be more easily opened and closed and at the same time acts as a valve state indicator.

The solution of the invention has several significant advantages. The state of the valve of the gas bottle can be discerned from a distance by the position of a lever comprised in the device of the invention. Moreover, the device makes it substantially easier to operate the valve. The acts of opening and closing the gas bottle are substantially easier to carry out. The valve will not be left open by mistake as often as in prior-art solutions. The device prevents the shut-off valve from being turned too far in the tightening direction, thus increasing the useful life of the valve. In a dangerous situation, the valve can be quickly closed with a single movement of the hand.

BRIEF DESCRIPTION OF THE DRAWINGS

In the following, the invention will be described by the aid of an example by referring to the attached drawings, in which.

DETAILED DESCRIPTION OF THE INVENTION

Figure 1:
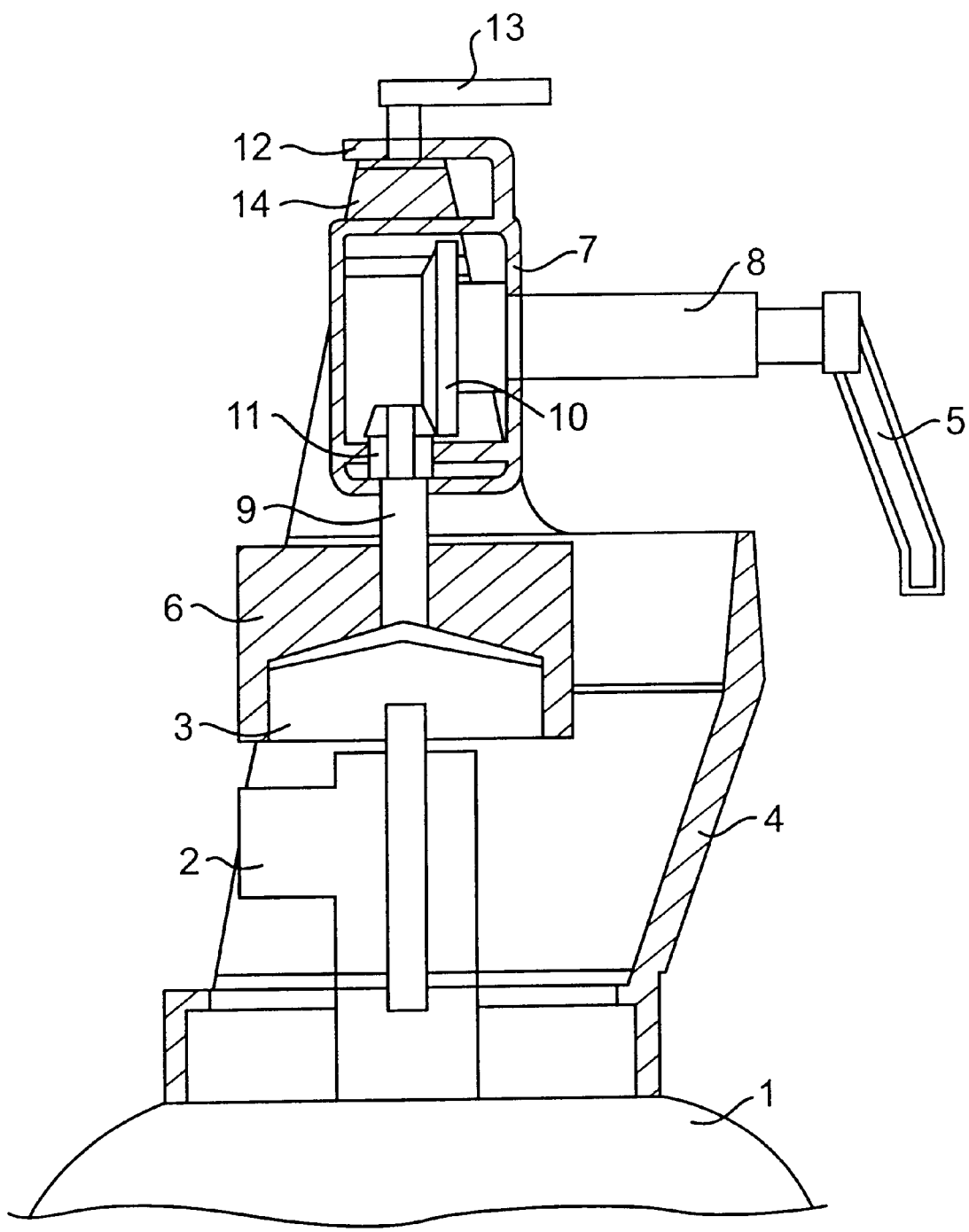
FIG. 1 presents a partially sectioned view of the upper part of a gas bottle provided with a device according to the invention.
Figure 2:
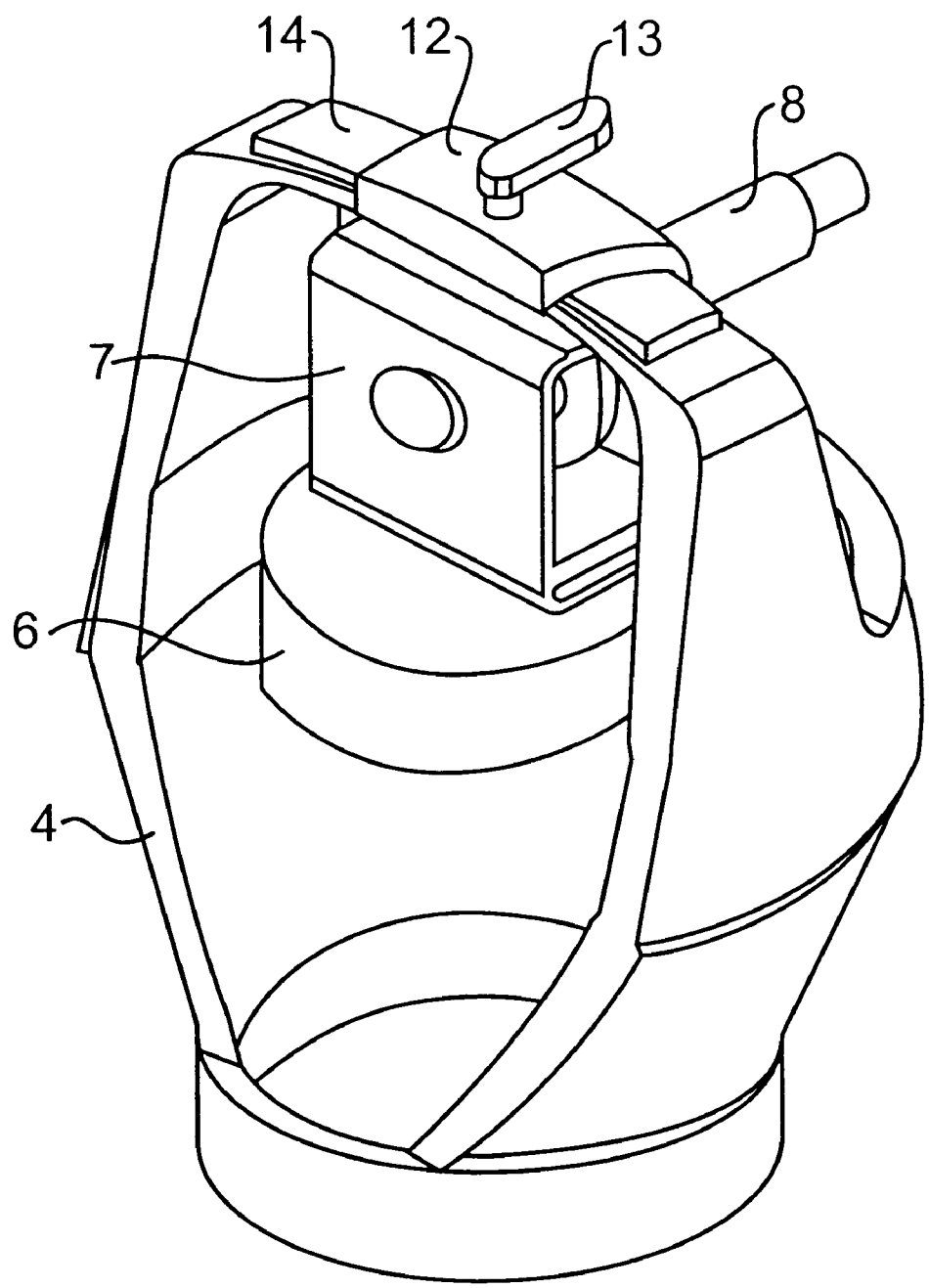
FIG. 2 presents a protective cap for a gas bottle and a regulating/closing device according to the invention.

FIG. 1 shows a shut-off valve 2 for a gas bottle 1, provided with a conventional regulating element 3, such as a regulating wheel or the like, for the opening and closing of the valve. Moreover, the gas bottle is provided with a protective cap 4 primarily to protect the valve 2. The protective cap 4 is attached by its collar to a screw thread usually provided on the bottle. The protective cap is open on two opposite sides. The upper part 14 of the protective cap has the shape of an ear handle. The device of the invention for adjusting/closing the shut-off valve 2 of a gas bottle or a similar container comprises a frame 7, a turning means 5, a coupling element 6 fitted to the regulating element 3 of the shut-off valve 2 of the gas bottle, and power transmission elements 8, 9, 10, 11 for the transmission of the motion of the turning means 5 to the regulating element 3. In the example in FIG. 1, the turning means 5 is a handle-shaped element.

The power transmission elements 8, 9, 10, 11 comprise a primary shaft 8 connected to the turning means 5, a secondary shaft 9 connected to the coupling element 6 and a transmission 10, 11 provided between said shafts 8, 9. The transmission 10, 11 includes herringbone gearing. The transmission ratio of the gearing is 2:1, so that when the handle 5 is turned e.g. through about 90°, the secondary shaft 9 will turn through about 180°. This angle of rotation of about 180° is usually sufficient to open/close the valve 2 of the gas bottle. In the example in the figure, bevel gears are used to achieve power transmission. It is obvious to the person skilled in the art that the invention can be implemented using any known power transmission system.

The primary shaft 8 of the turning means 5 is disposed in a direction transverse to the secondary shaft 9 of the coupling element 6. Thus, according to the embodiment illustrated by the figure, the turning means 5 is turned about an axis substantially perpendicular to the vertical axis of the gas bottle 1.

The primary shaft 8 of the turning means is thus substantially at right angles to the secondary shaft 9 of the regulating element 3 of the shut-off valve 2.

The turning means 5 and/or a separate accessory provided in conjunction with it works as an indicator of the state of the valve 2. For example, when the handle of the turning means 5 is pointing downward, the valve 2 is closed, and when the handle is pointing in a sideways direction, the valve 2 is open. In another example the valve 2 is closed when the handle of the turning means 5 is pointing upward, and when the handle is pointing sideways, the valve 2 is open.

The device of the invention is provided with fixing elements 12, 13. Therefore the frame 7 of the device can be removably attached to the protective cap 4 of a gas bottle.

The primary shaft 8 extends through the aperture in the protective cap 4, preferably to the side opposite to the side where the pressure reduction valves and gauges are placed.

The coupling element 6 is replaceable and it can be adapted so as to fit the regulating element 3 used. Thus, the device is independent of the design of the regulating element 3 of the valve 2 of the gas bottle.

The device can be provided with a detector for indicating the state of the valve 2. In this case, it is possible to equip a welding machine with a detector that, after disconnection of electric power to the welding machine, gives an indication if the gas bottle valve 2 has been left open.

It is obvious to the person skilled in the art that the invention is not limited to the embodiments described above, but that it may be varied within the sphere of protection defined by the claims.

What is claimed is:

1. An accessory for attachment to a container having an existing valve for controlling ingress and egress of substances into and out of the container, and an existing hand-operated rotatable valve actuator attached to the valve, said accessory comprising:

a frame for attachment to the container;

a rotatable handle supported for rotation by said frame;

a power transmission receiving a rotation force of said rotatable handle as an input; and a rotatable coupling element receiving an output of said power transmission, said rotatable coupling element for engaging the hand-operated rotatable valve actuator, wherein a relative angular position of said rotatable handle acts to indicate an opened or closed state of the valve, wherein said transmission acts in such a manner that a first degree of rotation of said rotatable handle is translated into a greater second degree of rotation of said rotatable coupling element.

2. The accessory according to claim 1, wherein a ratio of said second degree of rotation to said first degree of rotation is approximately 2 to 1.

3. The accessory according to claim 1, further comprising:

a rotatable primary shaft connecting said rotatable handle and said power transmission; and a rotatable secondary shaft connecting said power transmission and said rotatable coupling element.

4. The accessory according to claim 3, wherein said transmission includes a herringbone gear.

5. The accessory according to claim 3, wherein said rotatable handle is in the form of a lever attached to an end of said rotatable primary shaft.

6. The accessory according to claim 3, wherein said rotatable primary shaft extends in a first direction and said rotatable secondary shaft extends in a second direction.

7. The accessory according to claim 6, wherein said first direction is substantially at a right angle relative to said second direction.

8. A combination comprising:

a container;

a valve for controlling ingress and egress of substances into and out of said container;

a hand-operated rotatable valve actuator attached to said valve;

a frame attached to said container;

a rotatable handle supported for rotation by said frame;

a power transmission receiving a rotation force of said rotatable handle as an input; and a rotatable coupling element receiving an output of said power transmission, wherein said rotatable coupling element engages said hand-operated rotatable valve actuator and causes rotation of said hand-operated rotatable valve actuator in response to rotation of said rotatable handle, wherein a relative angular position of said rotatable handle acts to indicate an opened or closed state of said valve, wherein said power transmission acts in such a manner that a first degree of rotation of said rotatable handle is translated into a greater second degree of rotation of said rotatable coupling element.

9. The combination according to claim 8, wherein said rotatable coupling element is replaceable and can be adapted so as to fit said hand-operated rotatable valve actuator.

10. The combination according to claim 8, wherein a ratio of said second degree of rotation to said first degree of rotation is approximately 2 to 1.

11. The combination according to claim 8, further comprising:

a protective cap attached to said container, and wherein the attachment between said frame and said container is via a removable attachment between said frame and said protective cap.

12. The combination according to claim 11, further comprising:

a rotatable primary shaft connecting said rotatable handle and said power transmission; and a rotatable secondary shaft connecting said power transmission and said rotatable coupling element.

13. The combination according to claim 12, wherein said rotatable primary shaft extends through an aperture in said protective cap.

14. The combination according to claim 12, wherein said rotatable primary shaft extends in a first direction and said rotatable secondary shaft extends in a second direction, and wherein said first direction is substantially at a right angle relative to said second direction.

\* \* \* \* \*